Patented July 7, 1931

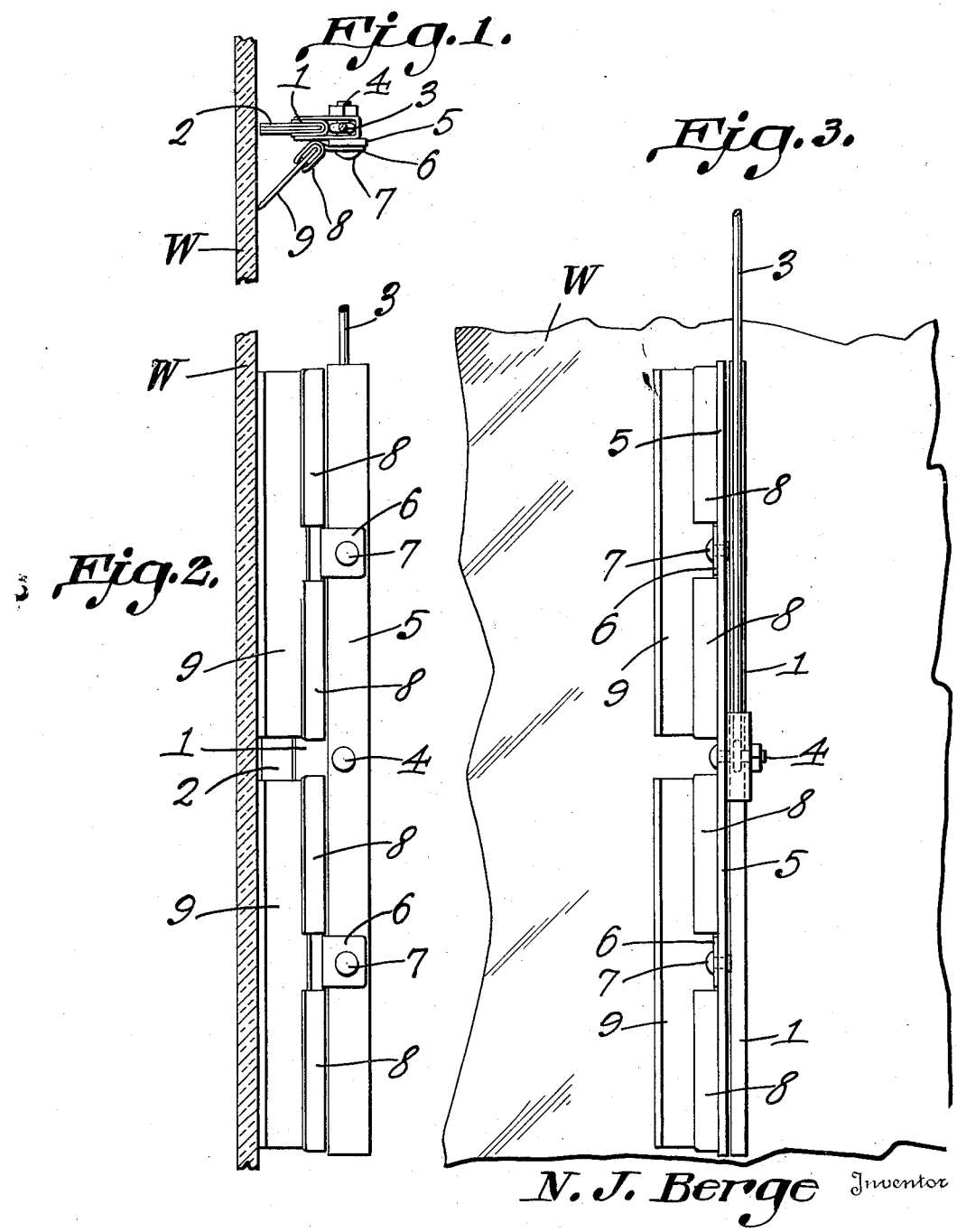

1,813,604

UNITED STATES PATENT OFFICE

NICOLAI J. BERGE, OF DEERFIELD, WISCONSIN

WINDSHIELD SCRAPER

Application filed July 7, 1930. Serial No. 466,265.

This invention relates to a scraper for windshields, one of the objects being to provide a device in the form of an attachment for a windshield wiper whereby frost can be removed from a windshield to maintain an unobstructed view.

A further object is to provide a scraper attachment adapted to be kept in position on the wiper without interfering with the ordinary functions thereof, there being separate scraping blades which can be easily and quickly placed in position to convert the device from a wiper to a scraper.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is an end view of a windshield wiper equipped with the scraper attachment.

Figure 2 is a bottom plan view thereof.

Figure 3 is a front elevation.

Referring to the figures by characters of reference, 1 designates the usual channeled strip holding a strip 2 of rubber or the like forming a squeegee type of wiper adapted to be moved back and forth over a windshield W by an arm 3.

Pivotally connected to the strip 1 at the center thereof by a bolt 4 is a strip 5 forming the body of the attachment. Ears 6 are in turn pivotally connected at 7 to the strip 1 at points preferably equally spaced from the bolt 4 and each of these ears is bent from the middle portion of a channel 8 forming a spring clip.

A thin sharp scraping blade is adapted to be seated in and held by each clip as shown at 9 and these blades are so proportioned that when their scraping edges are in engagement with the surface of the windshield, the wiping strip 2 will be held out of contact with the windshield. Consequently when the device is moved in the usual way, the edges of the blades 9 will scrape over the windshield and remove any incrustations of frost, etc.

The blades can be placed in or removed from position quickly and can be kept handy at all times for use in an emergency. When the blades are not in position the wiper can be used in the usual way.

The centrally pivoted strip 5 constitutes an equalizer whereby both blades are held against the windshield with the same degree of pressure.

What is claimed is:

A scraper including an equalizing strip for pivotal attachment at its center to a windshield wiper, clips pivotally connected to said strip at equal distances from its pivotal point, and scraping blades detachably mounted in the clips.

In testimony that I claim the foregoing as my own, I have hereto affixed my signature.

NICOLAI J. BERGE.